Nov. 13, 1928.
F. W. HARRIS
1,691,350
GAS TRAP
Filed Jan. 18, 1927
2 Sheets-Sheet 2
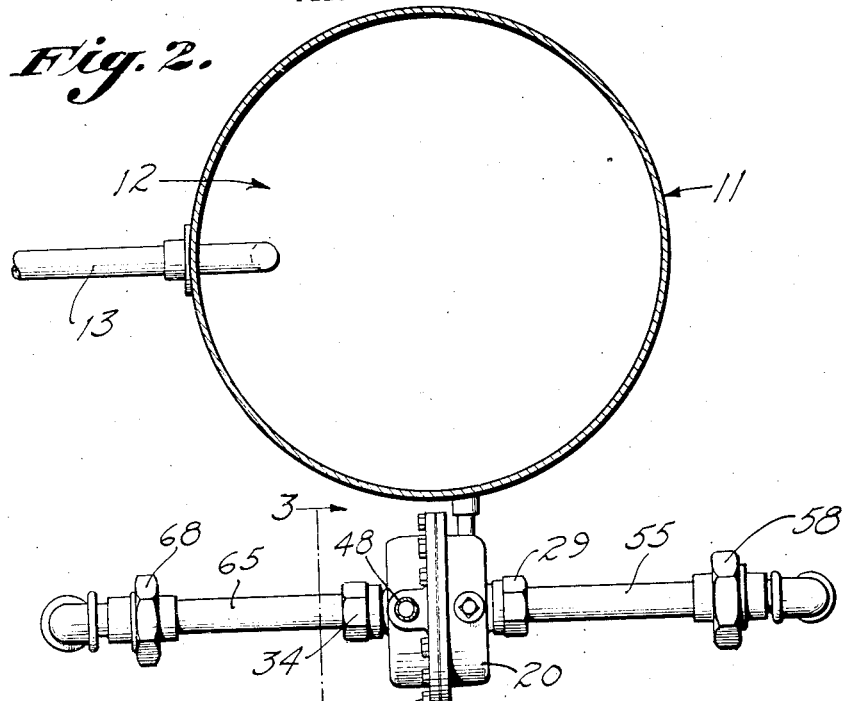
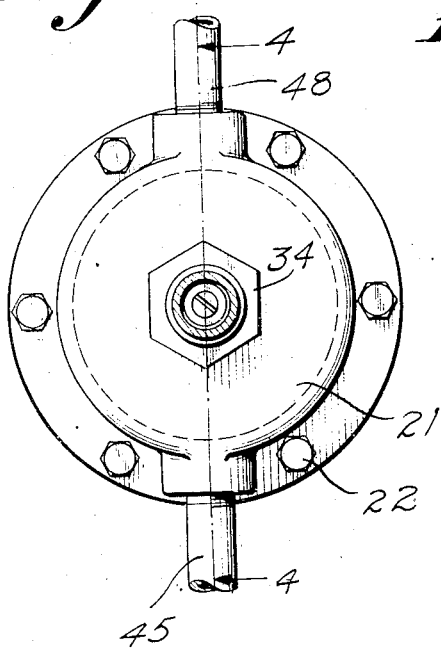
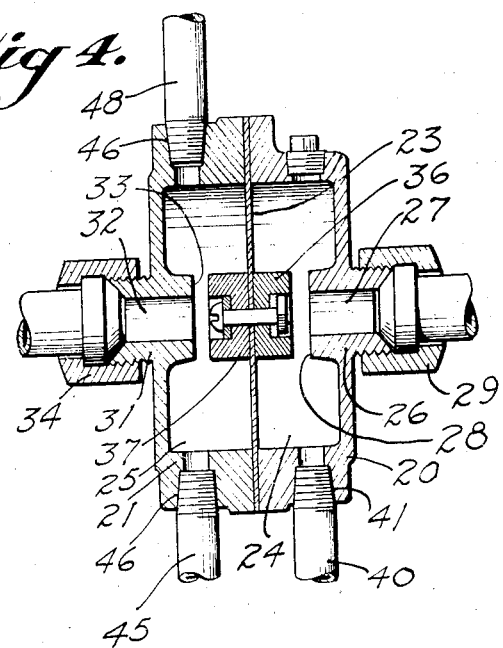
INVENTOR Patented Nov. 13, 1928.

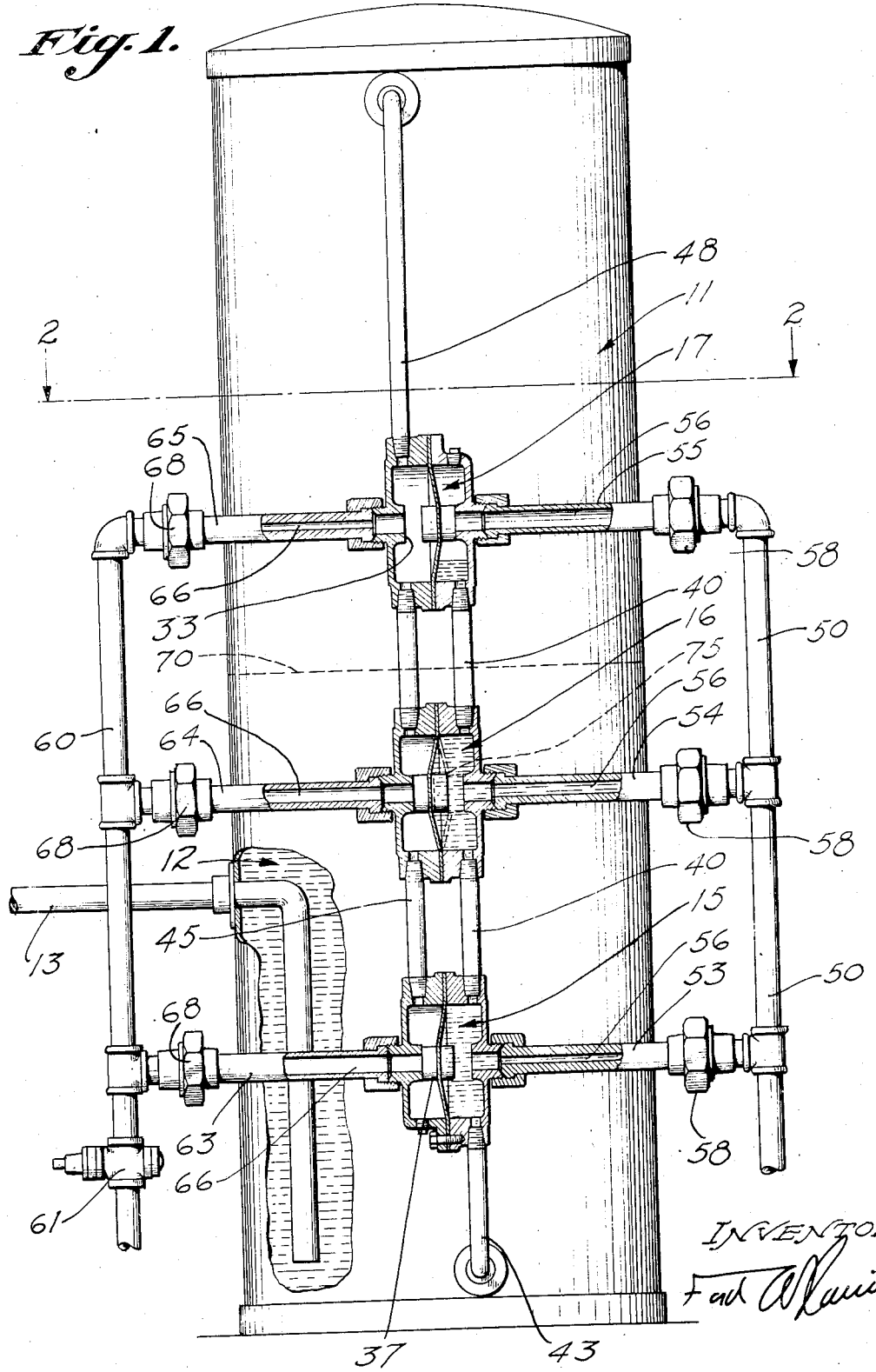

1,691,350

UNITED STATES PATENT OFFICE.

FORD W. HARRIS, OF LOS ANGELES, CALIFORNIA.

GAS TRAP.

Application filed January 18, 1927. Serial No. 161,841.

This invention relates to gas and liquid separators, and it relates particularly to a gas and oil separator which is useful in connection with oil wells for separating the gas from the oil as the mixture leaves the well.

In the production of petroleum oils, the oil either flows or is pumped from the well, and as it emerges from the well into the flow pipe the oil usually contains greater or smaller proportions of gas entrained therein. It is highly desirable to separate the gas from the oil at this point so that it will be unnecessary to keep the oil in gas-tight containers in order to conserve the gas. The gas is a valuable by-product, and it usually carries gasoline particles which are valuable.

It is an object of this invention to provide a simple form of gas and oil separator which may be placed at the well and which will operate to efficiently separate the gas and oil, delivering them through separate pipes for storage or other utilization.

The common form of separator consists of a tank which provides a separating chamber into which the gas-oil mixture is delivered for separation. A definite oil level is maintained by means of a float which controls a valve in the oil outlet pipe.

It is an object of this invention to provide a gas-oil separator in which the oil level is maintained at a definite level without the use of floats and by a mechanism which is placed outside the separating chamber.

There are a few gas-oil separators which employ a balance-valve for controlling the level of the oil. The design of a balance-valve is such that it is continually opening and closing, never opening wide enough to allow a substantial flow of oil. Since oil very often carries abrasive particles and since the opening provided when the balance-valve is opened is quite small, the oil passes outward at a high velocity, and the abrasive particles quickly wear away the valve parts.

It is an important object of this invention to provide a separator of the character mentioned having a valve construction in which the valve element is quickly moved into completely opened or closed position.

Other objects and advantages of the invention will be made evident hereinafter.

Referring to the drawings in which I illustrate a preferred form of the invention:

Fig. 1 is an elevational view partly sectioned.

Fig. 2 is a cross section taken on the line 2—2 of Fig. 1.

Fig. 3 is a fragmentary section taken on the line 3—3 of Fig. 2.

Fig. 4 is a fragmentary section of a valve construction of the invention taken on the line 4—4 of Fig. 3.

Referring in detail to the drawings, 11 is a tank which provides a closed separating chamber 12. An oil and gas mixture is introduced into the separating chamber 12 by means of a pipe 13 which extends through the side wall of the tank 11 and extends to a point near the bottom thereof. Arranged outside the tank 11 directly adjacent thereto and at different levels are valve constructions 15, 16 and 17.

Each valve construction 15, 16 or 17 is typically illustrated in Fig. 4, to which figure reference will now be had. A pair of castings 20 and 21 is secured together by bolts 22. Placed between the castings 20 and 21 is a diaphragm 23. The casting 20 provides a liquid chamber 24, and the casting 21 provides a gas chamber 25. The chambers 24 and 25 are separated by the diaphragm 23. The casting 20 has a boss 26 which provides a liquid port 27 and which projects into the liquid chamber 24 and provides a seat 28. The outer end of the boss 26 is externally threaded to receive a nut 29. The casting 21 has a boss 31 which provides a gas port 32. The inner end of the boss 31 projects into the gas chamber 25 and provides a seat 33. The outer end of the boss 31 is externally threaded to receive a nut 34. The diaphragm 23 is provided with a liquid valve 36 and a gas valve 37 which are located respectively in the chambers 24 and 25. The valves 36 and 37 are attached to the diaphragm 23 by a bolt 38. The liquid valve 36 is adapted to engage the seat 28, and the gas valve 37 is adapted to engage the seat 33.

Referring to Fig. 1, the valve constructions are arranged, as shown, and the liquid chambers 24 are connected in series by pipes 40 which screw into openings 41 of the castings 20. A lower pipe 43 is connected to the lower part of the bottom casting 20 and to the lower part of the tank 11. The gas chambers 25 are connected in series by pipes 45 which screw into openings 46 of the castings 21. A pipe 48 is connected to the upper part of the upper casting 21 and to the top part of the tank 11.

Extending at one side of the valve constructions is a liquid pipe 50. Connected to each of the respective valve constructions 15, 16 and 17 and to the liquid pipe 50 are liquid flow tubes 53, 54 and 55. One end of each of the flow tubes is connected so that an opening 56 thereof is in communication with a liquid port 27, by means of one of the nuts 29. The opposite ends of the liquid flow tubes are connected to the liquid pipe 50 by unions 58.

On the opposite sides of the valve constructions is a gas pipe 60, this gas pipe 60 having a pressure regulating valve 61. Connected to each of the respective valve constructions 15, 16 and 17 is a gas flow tube 63, 64 and 65. The gas flow tubes are connected to their respective valve structures so that openings 66 thereof are in communication with one of the gas ports 32, by means of the nuts 34. The opposite ends of the gas flow tubes are connected to the gas pipe 60 by means of unions 68.

The operation of the invention is as follows:

Before starting up the apparatus the pressure regulating valve 61 is set so that a pressure will be maintained inside the tank, sufficient to force liquid to a storage tank or other device to which it is to be delivered. At this time there is only an atmospheric pressure in the separating chamber 12. The valve constructions are arranged so that the diaphragm 23 is in an inactive position when there is no pressure in the separating chamber 12, the diaphragm in Fig. 4 being shown in this position. The gas-oil mixture flows through the pipe 13 into the bottom of the separating chamber 12. The diaphragms 23 will remain in inactive position until a gas pressure is established or until a head of oil is built up in the separating chamber. Before a pressure is established and before a head is built up oil will flow through the pipe 43 and into the liquid chamber of the lower valve construction 15, flowing through the liquid flow tube 53 into the liquid pipe 50. Gas at this time will flow into the pipe 48 and into the different gas chambers 25, passing through any of the gas flow tubes 63, 64 and 65 into the gas pipe 60.

When the oil level reaches a height indicated by the dotted line 70 in Fig. 1 and the proper gas pressure is established in the separating chamber, the diaphragms 23 will move into the positions shown in the drawings. In the valve construction 15 the gas valve 37 is shown seated. This is because of the fact that the liquid chamber 24 of this valve construction is filled with liquid and there is sufficient head to hold the diaphragm in the position shown, against the gas pressure. The oil level in the valve constructions is slightly higher than the oil level in the tank because the pressure in the tank is above atmospheric pressure. The pressure in the liquid chamber 24 of the valve construction 15 is greater than the gas pressure for the following reasons. In the first place, the pressure per square inch in the gas chamber of this valve construction is substantially the same as the pressure per square inch in the upper part of the separating chamber 12. The pressure per square inch in the liquid chamber 24 is equal to the gas pressure in the upper part of the separating chamber 12 plus the head of oil in the valve constructions; therefore, the pressure per square inch is greater in the liquid chamber than in the gas chamber. In view of the fact that the gas valve 37 is seated, the available area for the gas in the gas chamber 25 to press against is reduced, below that of the area against which the oil in the liquid chamber may press, an amount equal to the area of the gas valve 37. No gas can flow from the valve construction 15 but oil may flow therefrom through the liquid flow tube 53.

In the valve construction 16 the diaphragm 23 is flexed in the same manner as in 15, the gas valve 37 being closed and the liquid valve 36 being open. The valve construction 16 is in the position shown for the same reason as in regard to the valve construction 15.

Referring to the valve construction 17 the liquid valve 36 is closed and the gas valve 37 is open. This is because of the fact that the oil does not fill the liquid chamber 24 so that the pressure which the oil exerts against the diaphragm 23 is considerably lower than the pressure exerted in an opposite direction against the diaphragm 23 by the gas in the gas chamber 25. No oil will flow from the valve construction 16 but a small amount of gas may flow therefrom through the gas flow tube 65.

During the operation of the separator the oil level 70 may rise and sink. The invention, however, is designed to maintain the oil level substantially as indicated by the dotted line 70. It is impossible to keep the oil always at this level, however, because the gas-oil mixture varies in proportions so that some fluctuation in level is bound to occur. The valve constructions, however, will operate so as to return the oil level to normal as quickly as possible. If the oil level drops in the separating chamber 12, the head of oil in the valve constructions 15, 16 and 17 will be diminished. When the oil level drops to such an extent that the oil pressure is less than the gas pressure in the valve structure 16, the diaphragm 23 thereof will move from the position shown in full lines into a position indicated by dotted lines 75 of Fig. 1.

The valve constructions are each so designed that the valves will quickly open and close. Upon an initial movement of the diaphragm 23 the gas valve 37 is removed from its seat 33. This immediately exposes additional area for the gas to bear against. For this reason an additional force will be had, and the diaphragm will be quickly moved into the position shown by dotted lines 75. The oil when it rises again operates the valve construction 16 in substantially the opposite manner. The head of oil built up must be sufficient to overcome the force of the gas against the entire area of the diaphragm 23. When the diaphragm starts to move towards the gas chamber 25, the area of the liquid valve 36 is exposed to the oil so that an additional force is obtained which quickly moves the diaphragm into the position shown by full lines in Fig. 1. It will be seen that the operation of the valve is such that the pounds per square inch necessary to move the diaphragm in either direction must be greater than the pound pressure per square inch which resists this movement because of the fact that the area on the resisting side is greater than the area on the side of the diaphragm where a valve is closed. Because the pressure per square inch is greater, the instant the valve leaves its seat an additional area will be exposed and a greater force will be exerted against the diaphragm, this additional pressure serving to quickly move the diaphragm.

When the oil level 70 is high in the separating chamber 12 the volume of gas is quite small. At this time it is desirable to allow only a small amount of gas to escape and to build up the pressure above normal so that the oil may be forced outward at a higher rate of speed. Accordingly it is desirable to have the oil flow from the separating chamber faster when there is a larger body therein so that the oil level may be returned to normal. Conversely, when the oil level drops to the bottom of the separating chamber 12 there is a large volume of gas, and it is desirable to permit this gas to flow from the separating chamber at a higher rate of speed and to reduce the rate of flow of the oil from the separating chamber. By allowing the gas to flow in a larger volume from the separating chamber the gas pressure and volume is reduced and the oil may readily rise to normal. In order to obtain this feature the top liquid flow tube 55 has the largest opening 56 and the bottom liquid flow tube 53 has the smallest opening 56. On the other hand, the gas flow tube 65 which is at the top has the smallest opening 66 and the gas flow tube 63 which is at the bottom has the largest opening 66. When the oil level is at normal, as shown at 70, the gas can only escape through the upper gas flow tube 65. It will be seen that the area of cross section of the opening 66 is quite small so that little gas can escape. If the oil level rises so as to build up a head sufficient to close the gas valve in the valve contruction 17 and to open the liquid valve, the gas pressure will build up, but, on the other hand, the liquid flow tube 55 is opened so that the oil may flow therethrough to the liquid pipe 50. The area of cross section of the opening 56 of the liquid flow tube 55 is quite large so that oil may flow therethrough in considerable volume. When the oil level lowers, a larger volume of gas will collect in the separating chamber 12 and at this time the valve construction 17 will be operated so as to close the liquid valve and open the gas valve so that some of this gas may escape. The operation of the other valve constructions 15 and 16 is the same as the valve construction 17. In the case of the lower valve construction 15 the opening 66 through the gas flow tube 63 is very large so that a large volume of gas may flow therefrom. This is because of the fact that if the oil level lowers sufficiently to open the gas valve and to close the oil valve there will be a large amount of gas and practically no oil. To return the oil level to normal position this gas must be allowed to pass from the separating chamber 12 in a large volume.

The separator of this invention is effective in maintaining the level of the oil at normal during ordinary conditions and will quickly return the oil level to normal immediately after the occurrence of any abnormal condition, such as a large volume of oil or a large volume of gas being passed into the separating chamber 12.

A very important feature of the invention is that the valve constructions quickly open and close. As a result of this design the valves and seats will have a long life because they will not be cut by abrasive particles in the oil, which cutting would occur if the valves opened but a slight amount and vibrated back and forth with every slight fluctuation of the oil level.

I claim as my invention:

1. In a gas trap, the combination of: a tank providing a separating chamber; means for supplying a gas-liquid mixture to said separating chamber; a plurality of valve structures placed at different heights, each of said valve constructions consisting of a gas chamber, a liquid chamber, a pressure responsive member separating said chambers, a gas port for said gas chamber, a liquid port for said liquid chamber, a gas valve actuated by said pressure responsive member for closing said gas port, and a liquid valve actuated by said pressure responsive member for closing said liquid port; means for connecting said gas chambers to the gas end of said separating chamber; and means for connecting said liquid chambers to the liquid end of said separating chamber.

2. In a gas trap, the combination of: a tank providing a separating chamber; means for supplying a gas-liquid mixture to said separating chamber; a plurality of valve structures placed at different heights, each of said valve constructions consisting of a gas chamber, a liquid chamber, a diaphragm forming a common wall for said chambers, a gas port for said gas chamber, a liquid port for said liquid chamber, a gas valve carried by said diaphragm for closing said gas port, and a liquid valve carried by said diaphragm for closing said liquid port; means for connecting said gas chambers to the gas end of said separating chamber; means for connecting said liquid chambers to the liquid end of said separating chamber; a plurality of liquid flow tubes, one of said liquid flow tubes being connected to each of said liquid ports, said liquid tubes having different sized openings; and a plurality of gas flow tubes, one of said gas flow tubes being connected to each of said gas ports.

3. In a gas trap, the combination of: a tank providing a separating chamber; means for supplying a gas-liquid mixture to said separating chamber; a plurality of valve structures placed at different heights, each of said valve constructions consisting of a gas chamber, a liquid chamber, a diaphragm forming a common wall for said chambers, a gas port for said gas chamber, a liquid port for said liquid chamber, a gas valve carrier by said diaphragm for closing said gas port, and a liquid valve carried by said diaphragm for closing said liquid port; means for connecting said gas chambers to the gas end of said separating chamber; means for connecting said liquid chambers to the liquid end of said separating chamber; a plurality of liquid flow tubes, one of said liquid flow tubes being connected to each of said liquid ports, said liquid tubes having different sized openings; and a plurality of gas flow tubes, one of said gas flow tubes being connected to each of said gas ports, said gas flow tubes having different sized openings.

4. A combination as defined in claim 2 in which the liquid flow tube with the largest opening is in the highest position.

5. A combination as defined in claim 3 in which the gas flow tube with the largest opening is in the lowest position.

6. A combination as defined in claim 3 in which the gas flow tube with the largest opening is in the lowest position and the liquid flow tube with the largest opening is in the highest position.

7. In a gas trap, the combination of: a tank providing a separating chamber; means for supplying a gas-liquid mixture to said separating chamber; a plurality of valve structures placed at different heights, each of said valve constructions consisting of a gas chamber, a liquid chamber, a pressure responsive member separating said chambers, a gas port for said gas chamber, a liquid port for said liquid chamber, a gas valve actuated by said member for closing said gas port, and a liquid valve actuated by said member for closing said liquid port; means for connecting said gas chambers to the gas end of said separating chamber; and means for connecting said liquid chambers to the liquid end of said separating chamber.

In testimony whereof, I have hereunto set my hand at Los Angeles, California, this 13th day of January, 1927.

FORD W. HARRIS.